Nov. 21, 1961 M. FIEDLER ET AL 3,009,192
HINGE FOR AUTOMOBILE HOOD
Filed May 25, 1959 2 Sheets-Sheet 1
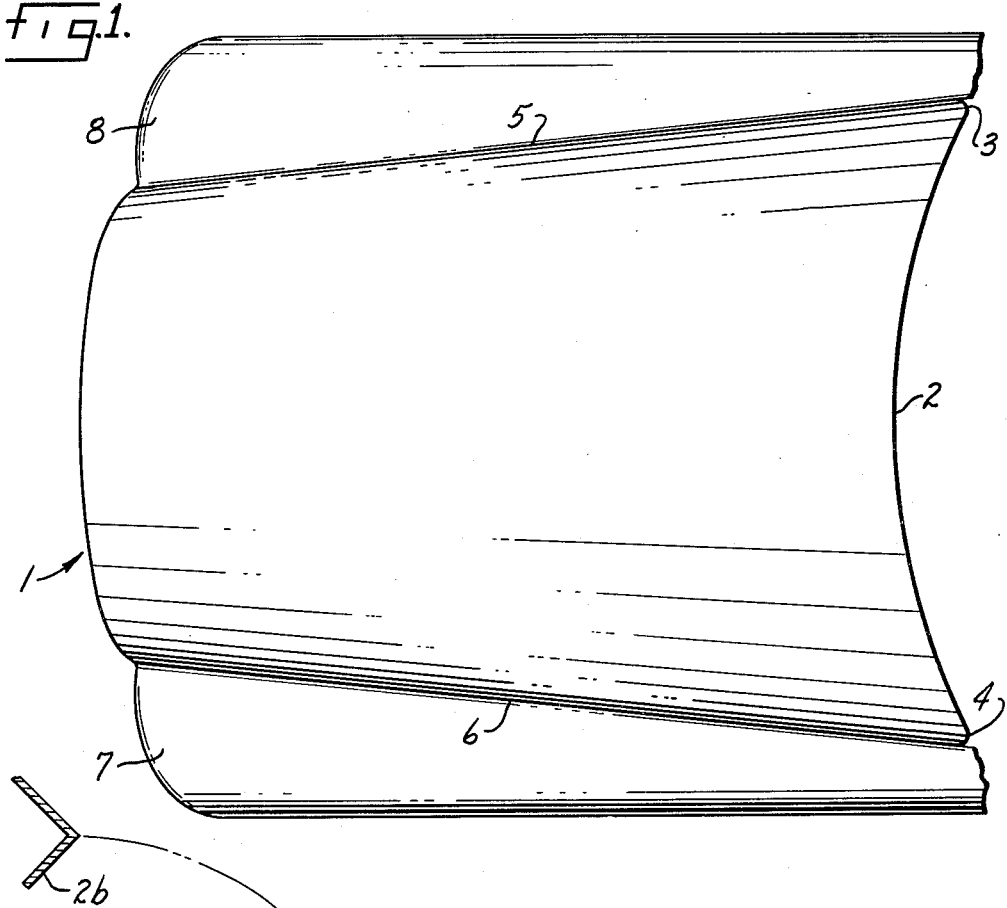
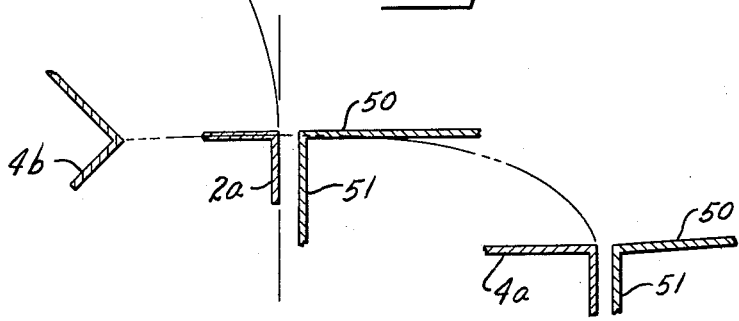
INVENTORS.
MARTIN FIEDLER
GEORGE KORAB
HERBERT KRAUSE
BY Parker & Carter
ATTORNEYS.

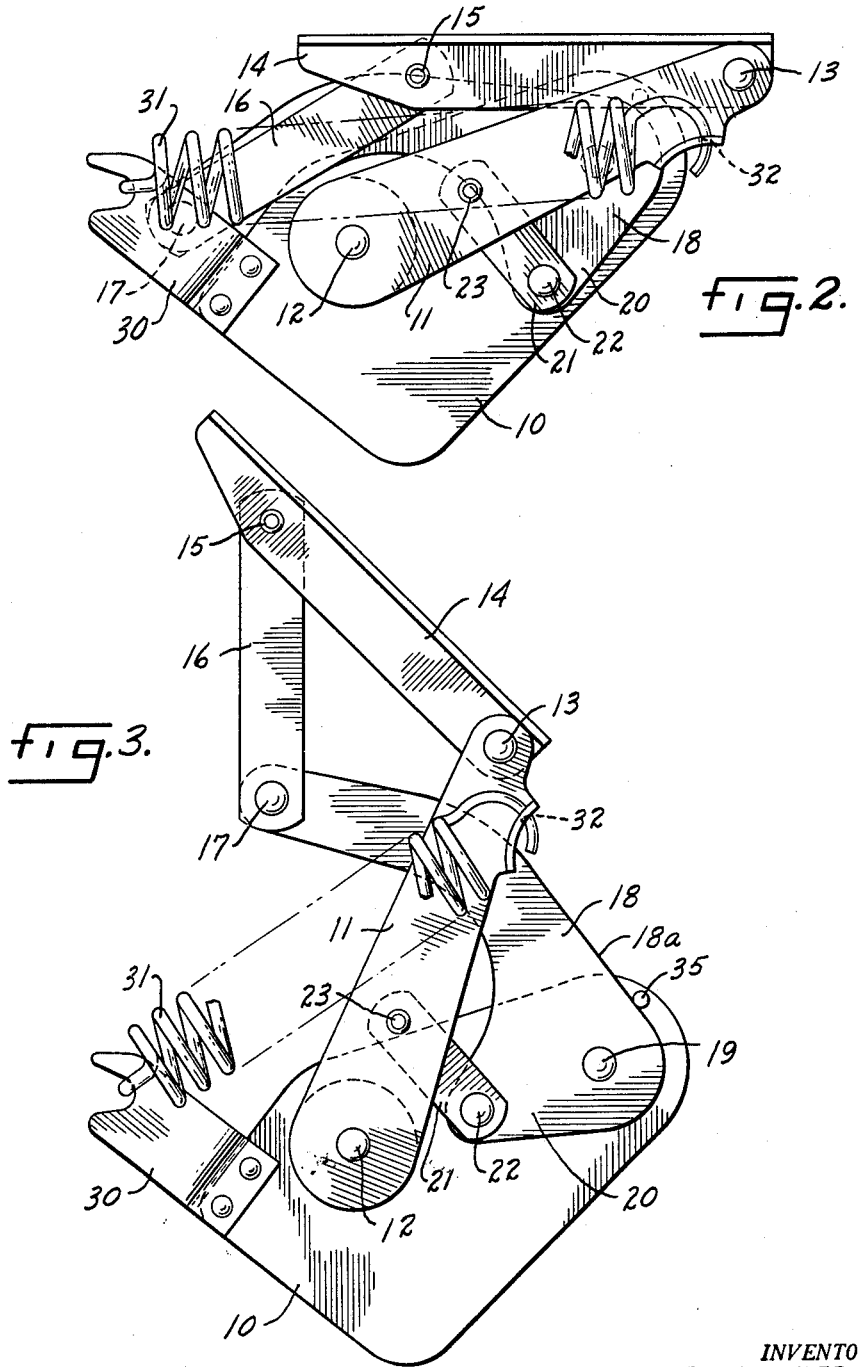

United States Patent Office 3,009,192
Patented Nov. 21, 1961

3,009,192
HINGE FOR AUTOMOBILE HOOD
Martin Fiedler and George Korab, Chicago, and Herbert Krause, Park Ridge, Ill., assignors to Chicago Forging and Manufacturing Company, Chicago, Ill., a corporation of Delaware
Filed May 25, 1959, Ser. No. 815,563
11 Claims. (Cl. 16—128.1)

This invention relates to hinges and has particular relation to a hinge useable in association with the hood of an automobile and the cover for said hood.

One purpose is to provide a hinge effective for employment in the limited space available in the hood of small automobiles.

Another purpose is to provide a hinge effective to produce an initial raising upwardly of the cover of an automobile hood and the later tilting thereof during the travel of the cover from closed to open position.

Another purpose is to provide a hingle effective to preclude binding or contact of the rear edge of the automobile hood cover with adjacent portions of the automobile as the cover is raised.

Another purpose is to provide a hinge for an automobile hood cover effective to preclude binding of the rear corners, as well as the central portion of the rear edge of a hood cover when said cover is moved from closed to open position.

Another purpose is to provide a hinge for automobile hood covers having yielding means arranged to urge the hood cover toward open position.

Another purpose is to provide a hinge for automobile hood covers and the like having a guide link arranged to insure the precise, desired, predetermined course of the cover from closed to open position.

Another purpose is to provide a hinge for hood covers and the like which, when said hinge is in closed position, occupies a minimum area.

Other purposes will appear from time to time in the course of the specification and claims.

We illustrate our invention more or less diagrammatically in the accompanying drawings wherein:

FIGURE 1 is a top plan view of the forward portion of an automobile with which our invention may be associated.

FIGURE 2 is a side view illustrating the hinge of our invention in the closed position.

FIGURE 3 is a side view illustrating the hinge of our invention in open position, and FIGURE 4 is a diagrammatic illustraton of the path traveled by a hood cover controlled by the hinge of our invention.

Referring now to the drawings and in particular to FIGURE 1, the numeral 1 generally indicates an automobile hood cover. The cover 1 has an arcuate rear edge 2 terminating at its opposite ends in rear corners 3, 4. The side edges 5, 6 of the cover 1 lie in forwardly converging planes. Fenders 7,8 abut the side edges 5, 6.

Referring now to FIGURE 2, a base or mounting plate is illustrated at 10. It will be understood that the plate 10 may take a variety of forms but is generally rectilinear and of sufficiently reduced size to be mounted upon the side walls of an automobile hood within fenders 7, 8.

For ease in desiription, the right hand portion of FIGURE may be ionsidered a rear portion and the left hand portion may be considered the forward portion. Accordingly, a lever arm 11 is pivotally mounted adjacent one of its ends, as at 12, upon, and adjacent a forward portion of, plate 10. The lever 11, as illustrated in FIGURE 1, extends rearwardly in an upwardly inclined path and has its opposite end pivotally connected, as at 13, to a cover-supporting bracket 14. The cover-supporting bracket 14 extends forwardly to a point substantially coterminous with the forward edge of lever 11 and has pivotally secured adjacent its forward end, as at 15, a second arm 16, the pivotal connection 15 being arranged adjacent the upper rear end of the arm 16.

The arm 16 is inclined downwardly from its rear to its forward end and is pivotally connected adjacent its forward end, as at 17, to the forward end of a third arm 18. The arm 18 has a major arcuate portion curving upwardly and rearwardly from its forward end, as the parts are shown in FIGURE 1, and thence downwardly to its rear portion adjacent which it is pivotally mounted to plate 10 as at 19.

The arm 18 has an angularly directed portion 20 extending in an inclined direction downwardly and forwardly from pivot point 19, as the parts are shown in FIGURE 1, and carrying adjacent its outer edge a guide link 21. The guide link 21 is pivotally mounted, adjacent one of its ends as at 22, to lever arm portions 20 and the guide link 21 is pivotally connected, adjacent its opposite end as at 23, to the first-named arm 11 at a point intermediate the ends of arm 11. It will be observed that pivotal connection 23 is arranged on arm 11 at a poirťt substantially closer to pivot 12 than it is to pivot 13 and that pivot point 23 is in substantially direct alignment with the pivot points 12 and 13. Thus the guide link 21 is arranged, when the parts are in the position illustrated in FIGURE 1, in a plane downwardly inclined and laterally extending from the plane occupied by lever arm 11, the pivot point 22 being beneath lever arm 11.

A bracket 30 is fixed on plate 10 and supports at its outer forward end a yielding member which may take the form of the spring 31. Spring 31 extends rearwardly from bracket 30 and has its opposite end connected to lever arm 11 adjacent the upper rear end of arm 11 as at 32. The spring 31 is positioned in a plane, as the parts are illustrated in FIGURE 1, lying above the pivot points 12, 17, 19, 22, 23 and is, when the hinge is in the closed position illustrated in FIGURE 1, under tension and exerting its force in a direction to urge the hinge of our invention toward open position.

Referring now to FIGURE 3, the hinge of our invention is illustrated in open position. The spring 31 continues to urge the hinge of our invention toward open position and aids in maintaining the hinge, and therefore the cover to which it is attached, in open position.

Referring now to FIGURE 4, we illustrate diagrammatically a cowl 50 and firewall 51. It will be seen that the center portion of the rear edge 2 of cover 1, illustrated diagrammatically by the member 2a, initially rises substantially vertically and, as the hinge of our invention progressively moves toward full open position, the rear edge indicated by the member 2a is caused gradually to tilt toward the final position illustrated at 2b in the upper left-hand corner of FIGURE 4. It is equally important that the rear or corner portions 3, 4 of the cover 1 be prevented from binding upon or against the inwardly tapering edges of fenders 7, 8 as the cover 1 is raised. Accordingly, we illustrate diagrammatically in FIGURE 4, as by the member 4a, the travel of the corner 4 of cover 1. The corner member 4a rises initially in a generally vertical path and is progressively tilted, following a path of less arc than that of the member 2a and finally reaching the tilted position illustrated in the left hand portion of the drawing at 4b.

As the hinge of our invention is moved from the position illustrated in FIGURE 2 to that illustrated in FIGURE 3, the pivot point 22 of guide link 21 is caused to follow an arcuate path running forwardly of a line drawn through pivot points 22, 23 and then returning toward said line as the hinge of our invention reaches full open position. The pivot point 23 is simultaneously caused to follow an arcuate path extending initially rearwardly of said line and then curving back toward said line as the hinge of our invention reaches open position. The guide line is arranged to produce an upwardly inclined pushing action on the arm 11 and to guarantee the following of the predetermined desired path by the rear upper end of arm 11 and consequently by the rear edge of the cover 1. A stop element 35 is fixed on plate 10 and serves as an abutment for the edge 18a of arm 18 when the hinge of our invention has reached its full upward travel.

Whereas, we have described and illustrated a practical and operative device, nevertheless, many changes may be made in the size, shape, number and disposition of parts without departing from the spirit of my invention. We, therefore, wish our description and drawings to be taken as, in a broad sense, illustrative or diagrammatic, rather than as limiting us to our precise showing.

We claim:

1. In a hinge, a mounting plate, a first arm pivotally mounted adjacent a forward portion of said plate and extending rearwardly and upwardly from said forward portion, a mounting bracket pivotally connected at its rear edge to said first arm adjacent the rear end of said first arm, a second arm pivotally connected at one of its ends to a forward portion of said bracket, a third arm pivotally connected adjacent its rear end to a rearward portion of said plate, said third arm extending forwardly and having its forward end pivotally connected to the forward end of said second arm, said third arm having a laterally disposed portion, a guide link pivotally connected at its opposite ends respectively to said laterally extending portion and to said first arm, said guide link being pivotally connected to said first arm at a point intermediate its ends, said third arm laterally extending portion, when said hinge is in closed position, extending downwardly from the longitudinal center line of said third arm, said guide link, when said hinge is in closed position, extending upwardly and forwardly from said third arm.

2. In a hinge, a mounting plate, a first arm pivotally mounted adjacent a forward portion of said plate and extending rearwardly and upwardly from said forward portion, a mounting bracket pivotally connected at its rear edge to said first arm adjacent the rear end of said first arm, a second arm pivotally connected at one of its ends to a forward portion of said bracket, a third arm pivotally connected adjacent its rear end to a rearward portion of said plate, said third arm extending forwardly and having its forward end pivotally connected to the forward end of said second arm, said third arm having a laterally disposed portion, a guide link pivotally connected at its opposite ends respectively to said laterally extending portion and to said first arm, said guide link being pivotally connected to said first arm at a point intermediate its ends, said third arm laterally extending portion, when said hinge is in closed position, extending downwardly from the longitudinal center line of said third arm, said guide link, when said hinge is in closed position, extending rearwardly downwardly from said first arm, and a spring secured at one of its ends to a forward portion of said mounting plate and at its opposite end to said first arm at a point adjacent the rear end of said first arm, said spring being under tension when said hinge is in closed position and adapted to urge said hinge toward open position.

3. In a hinge, a mounting plate, a first arm pivotally connected to a forward portion of said mounting plate at a point adjacent the forward end of said arm, said first arm extending rearwardly and upwardly from said pivot point and being pivotally connected at its opposite end to the rear end of a mounting bracket, a second arm pivotally connected adjacent its rear end to the forward end of said mounting bracket, a third arm pivotally connected at its rear end to a rear portion of said mounting plate and extending forwardly therefrom, said third arm being pivotally connected at its forward end to the forward end of said second arm, said third arm being pivotally connected to said mounting plate at a point underlying said first arm when said hinge is in closed position, said third arm having a laterally extending portion, said last-named portion extending downwardly, forwardly from the rear end of said third arm when said hinge is in closed position, a guide link pivotally connected at one of its ends to said laterally extending portion, said guide link being pivotally connected at its opposite end to said first arm at a point intermediate the ends of said first arm and yielding means connected to said plate and said first arm and positioned and adapted to urge said hinge toward open position.

4. In a hinge, a mounting plate, a first arm pivotally connected to a forward portion of said mounting plate at a point adjacent the forward end of said arm, said first arm extending rearwardly and upwardly from said pivot point and being pivotally connected at its opposite end to the rear end of a mounting bracket, a second arm pivotally connected adjacent its rear end to the forward end of said mounting bracket, a third arm pivotally connected at its rear end to a rear portion of said mounting plate and extending forwardly therefrom, said third arm being pivotally connected at its forward end to the forward end of said second arm, said third arm being pivotally connected to said mounting plate at a point underlying said first arm when said hinge is in closed position, said third arm having a laterally extending portion, said last-named portion extending downwardly, forwardly from the rear end of said third arm when said hinge is in closed position, a guide link pivotally connected at one of its ends to said laterally extending portion, said guide link being pivotally connected at its opposite end to said first arm at a point intermediate the ends of said first arm and yielding means connected to said plate and said first arm and positioned and adapted to urge said hinge toward open position, said yielding means comprising a coil spring secured at its forward end to said mounting plate and at its rearward end to said first arm, said spring, when said hinge is in closed position, having its longitudinal axis above the pivotal connection between said first arm and said mounting plate and above the pivotal connection between said second and third arms and above the pivotal connection between said third arm and said mounting plate and above said guide link.

5. In a hinge, a mounting plate, a first arm pivotally connected to a forward portion of said mounting plate at a point adjacent the forward end of said arm, said first arm extending rearwardly and upwardly from said pivot point and being pivotally connected at its opposite end to the rear end of a mounting bracket, a second arm pivotally connected adjacent its rear end to the forward end of said mounting bracket and extending forwardly, downwardly from said bracket when said hinge is in closed position, a third arm pivotally connected at its rear end to a rear portion of said mounting plate and extending forwardly therefrom, said third arm being pivotally connected at its forward end to the forward end of said second arm, said third arm being pivotally connected to said mounting plate at a point underlying said first arm when said hinge is in closed position, said third arm having a laterally extending portion, said last-named portion extending downwardly, forwardly from the rear end of said third arm when said hinge is in closed position, a guide link pivotally connected at one of its ends to said laterally extending portion, said guide link being pivotally connected at its opposite end to said first arm at a point intermediate the ends of said first arm and yielding means connected to said plate and said first arm and positioned and adapted to urge said hinge toward open position.

6. In a hinge, a mounting plate, a first arm pivotally connected to a forward portion of said mounting plate at a point adjacent the forward end of said arm, said first arm extending rearwardly and upwardly from said pivot point and being pivotally connected at its opposite end to the rear end of a mounting bracket, a second arm pivotally connected adjacent its rear end to the forward end of said mounting bracket and extending forwardly, downwardly from said bracket when said hinge is in closed position, a third arm pivotally connected at its rear end to a rear portion of said mounting plate and extending forwardly therefrom, said third arm being pivotally connected at its forward end to the forward end of said second arm, said third arm being pivotally connected to said mounting plate at a point underlying said first arm when said hinge is in closed position, said third arm having a laterally extending portion, said last-named portion extending downwardly, forwardly from the rear end of said third arm when said hinge is in closed position, a guide link pivotally connected at one of its ends to said laterally extending portion, said guide link being pivotally connected at its opposite end to said first arm at a point intermediate the ends of said first arm and yielding means connected to said plate and said first arm and positioned and adapted to urge said hinge toward open position, said third arm lying between said plate and said first and second arms, said guide link lying between said first and third arms.

7. In a hinge, a mounting plate, a first arm pivotally connected to a forward portion of said mounting plate at a point adjacent the forward end of said arm, said first arm extending rearwardly and upwardly from said pivot point and being pivotally connected at its opposite end to the rear end of a mounting bracket, a second arm pivotally connected adjacent its rear end to the forward end of said mounting bracket, a third arm pivotally connected at its rear end to a rear portion of said mounting plate and extending forwardly therefrom, said third arm being pivotally connected at its forward end to the forward end of said second arm, said third arm being pivotally connected to said mounting plate at a point underlying said first arm when said hinge is in closed position, said third arm having a laterally extending portion, said last-named portion extending downwardly, forwardly from the rear end of said third arm when said hinge is in closed position, a guide link pivotally connected at one of its ends to said laterally extending portion, said guide link being pivotally connected at its opposite end to said first arm at a point intermediate the ends of said first arm and yielding means connected to said plate and said first arm and positioned and adapted to urge said hinge toward open position, said first and second arms and said guide link being of generally rectilinear configuration, said third arm being of substantially arcuate configuration.

8. In a hinge, a mounting plate, a first arm pivotally mounted adjacent a forward portion of said plate and extending rearwardly and upwardly from said forward portion, a mounting bracket pivotally connected at its rear edge to said first arm adjacent the rear end of said first arm, a second arm pivotally connected at one of its ends to a forward portion of said bracket, a third arm pivotally connected adjacent its rear end to a rearward portion of said plate, said third arm extending forwardly and having its forward end pivotally connected to the forward end of said second arm, said third arm having a laterally disposed portion, a guide link pivotally connected at its opposite ends respectively to said laterally extending portion and to said first arm, said guide link being pivotally connected to said first arm at a point intermediate its ends, said third arm laterally extending portion, when said hinge is in closed position, extending downwardly beneath said third arm, said guide link, when said hinge is in closed position, extending downwardly from the remainder of said third arm, said guide link, when said hinge is in closed position, extending rearwardly downwardly from said third arm, said parts being arranged to cause one end of said guide link to describe a forwardly arcuate path and the opposite end of said guide link to describe a rearwardly arcuate path as said hinge moves from closed to open position.

9. In a hinge, a mounting plate, a first arm pivotally mounted adjacent a forward portion of said plate and extending rearwardly and upwardly from said forward portion, a mounting bracket pivotally connected at its rear edge to said first arm adjacent the rear end of said first arm, a second arm pivotally connected at one of its ends to a forward portion of said bracket, a third arm pivotally connected adjacent its rear end to a rearward portion of said plate, said third arm extending forwardly and having its forward end pivotally connected to the forward end of said second arm, said third arm having a laterally disposed portion, a guide link pivotally connected at its opposite ends respectively to said laterally extending portion and to said first arm, said guide link being pivotally connected to said first arm at a point intermediate its ends, said third arm laterally extending portion, when said hinge is in closed position, extending downwardly from the pivot point of said third arm on said plate, said guide link, when said hinge is in closed position, extending rearwardly downwardly from said first arm, said parts being so arranged that, when the hinge is in closed position, said first arm, guide link and all but the forward portion of said second and third arms lie within an area within a linear distance from the forward to the rear edge of said first arm.

10. A hinge comprising a support, a bracket, a pair of arm members pivotally connected to said support, one of said members being pivotally connected to said bracket, the other of said members being pivotally connected to a third arm member, said third arm member being pivotally connected to said bracket and a link pivotally connected to and joining said pair of arm members, said link being positioned to exert upwardly-directed pressure upon an intermediate portion of one of said pair of arm members in response to initial movement of said hinge from closed toward open position.

11. A hinge comprising a support, a bracket, a first arm pivotally connected to a forward portion of said support and to a rearward portion of said bracket, an articulated member comprising a second arm pivotally connected to said bracket and a third arm pivotally connected to said support, said second and third arms being pivotally connected together to form said articulated member, and a control link pivotally connected to said third arm and to said first arm and positioned to exert upwardly-directed pressure on said first arm in response to initial movement of said hinge from closed toward open position.

References Cited in the file of this patent
UNITED STATES PATENTS

| | | |
|---|---|---|
| 2,634,455 | Fish | Apr. 14, 1953 |
| 2,668,320 | Lustig | Feb. 9, 1954 |
| 2,720,676 | Vigmostad | Oct. 18, 1955 |